Feb. 15, 1949.　　C. O. SLEMMONS ET AL　　2,461,849
VEHICLE TRACK
Filed May 15, 1946　　2 Sheets-Sheet 1
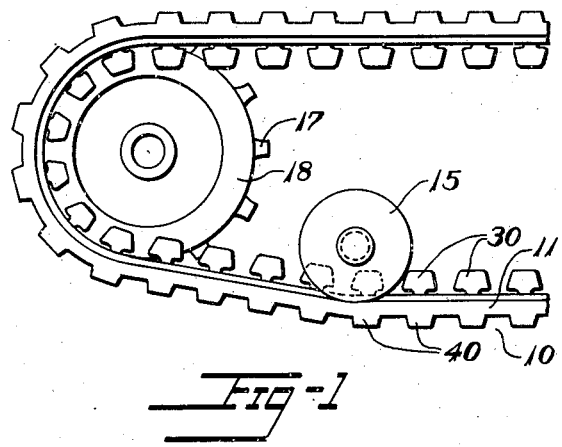
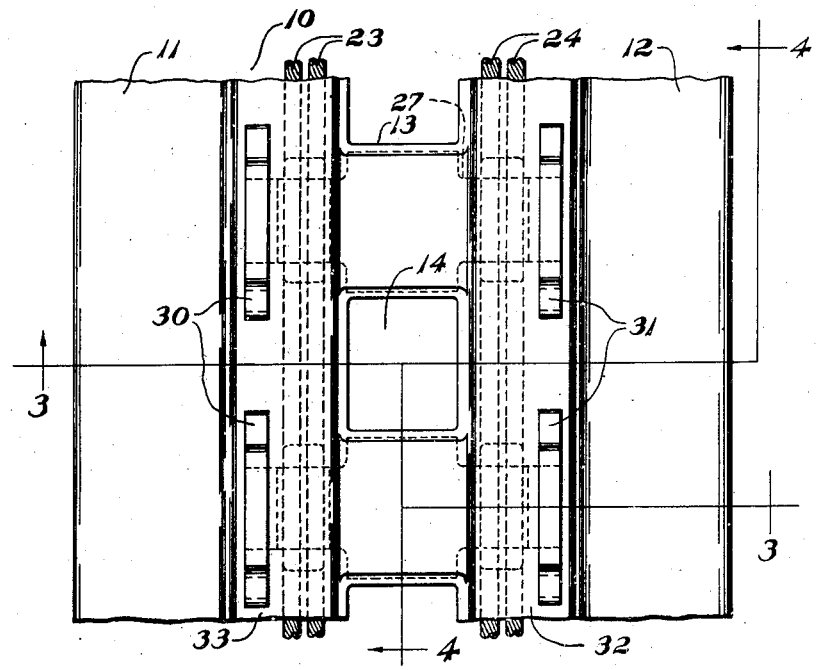
Inventors
Charles O. Slemmons
Robert W. Smith
By
Atty.

Feb. 15, 1949. C. O. SLEMMONS ET AL 2,461,849
VEHICLE TRACK
Filed May 15, 1946 2 Sheets-Sheet 2
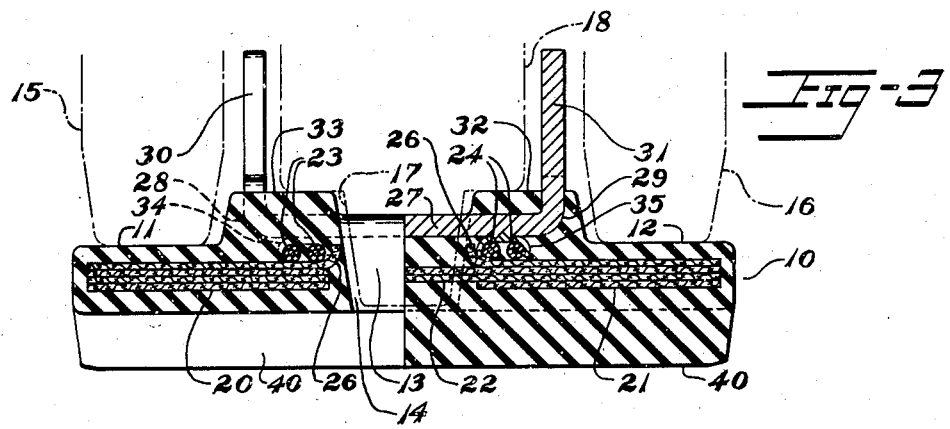
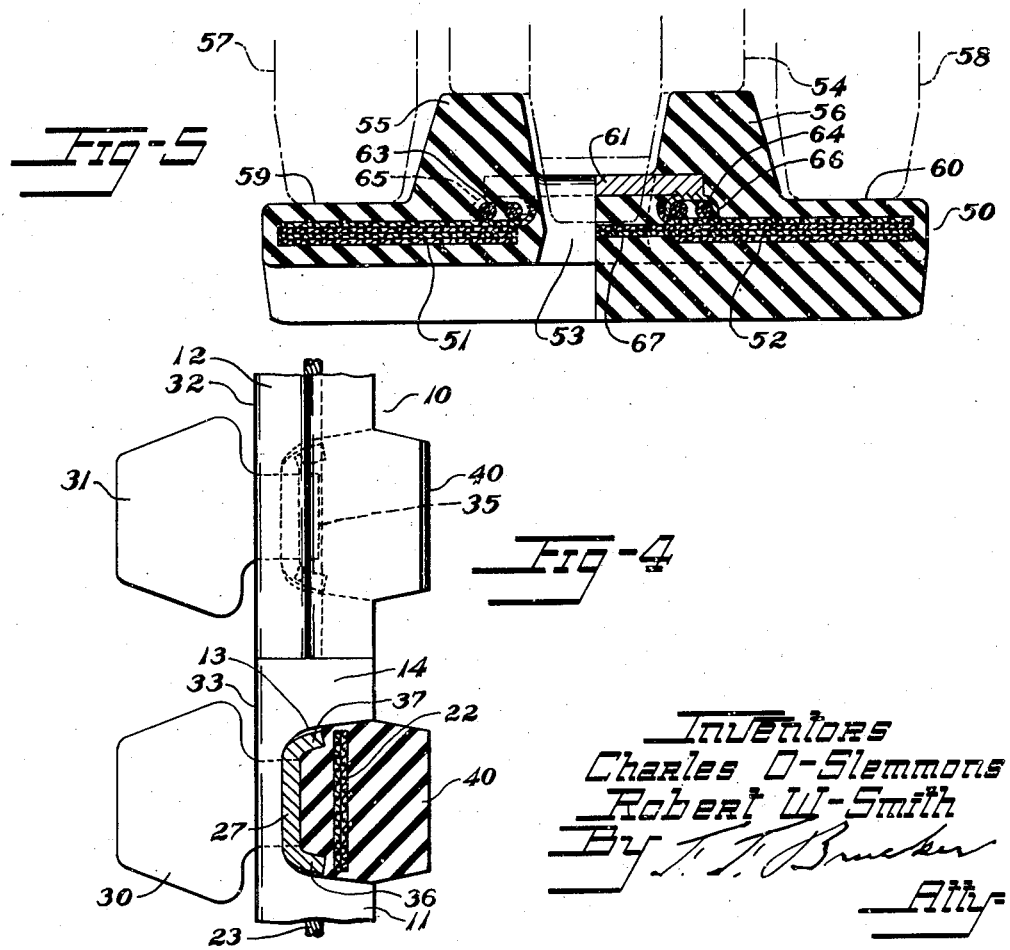
Inventors
Charles O. Slemmons
Robert W. Smith Patented Feb. 15, 1949

2,461,849

UNITED STATES PATENT OFFICE 2,461,849

VEHICLE TRACK

Charles O. Slemmons, South Bend, Ind., and Robert W. Smith, Copley, Ohio, assignors to The B. F. Goodrich Company, New York, N. Y., a corporation of New York Application May 15, 1946, Serial No. 669,872

9 Claims. (Cl. 305—10)

This invention relates to tracks for self-laying track type vehicles, and the invention is especially useful where positive driving combined with light weight of equipment is required.

Heretofore, tracks for vehicles have been proposed in which heavy cross bars of metal were hinged to each other and were positively driven by sprockets. While such tracks provided the advantage of positive driving, when it was attempted to shoe such tracks with rubber treads, chipping and bruising of the rubber material between the metal bars and the tread face of the track by contact with stones, especially at the ends of the cross bars, presented difficulty.

It has also been proposed to eliminate the use of cross bars and to drive the track by friction alone, but use of such a construction requires a great area of angular contact or "wrap" about the driving wheel and confines the use of such tracks to drives for light vehicles providing great angular contact of the drive wheel.

It is an object of the present invention to avoid the foregoing and other difficulties, and to provide in a large measure the advantages of both the positive drive type of track and the friction drive track, while avoiding disadvantages of both types of track.

Other objects of the invention are to provide a track adapted for use where angular contact or "wrap" about the drive wheel is small, to provide lightness of construction with flexibility of operation, to reduce chipping of the rubber tread, and to provide good cushioning of the load.

These and other objects will appear from the following description and the accompanying drawings.

Of the drawings,

Fig. 1 is a side elevation of a portion of a track constructed in accordance with and embodying the invention, showing a drive wheel and one of the bogie wheels.

Fig. 2 is a plan view of a portion of the track, looking at the wheel-engaging face thereof.

Fig. 3 is a cross sectional view of the track, taken on line 3—3 of Fig. 2, the position of the driving sprocket and the bogie wheels being indicated by dot and dash lines.

Fig. 4 is a sectional view thereof taken on line 4—4 of Fig. 2.

Fig. 5 is a cross-sectional view similar to Fig. 3, showing a modification of the invention, the positions of the driving sprocket and bogie wheels being indicated in dot and dash lines.

Referring to the drawings, the numeral 10 designates a body of resilient soft vulcanized rubber or other rubber-like material formed to provide a ladder-like structure of continuous runners 11, 12 at its side margins separated by connecting rung portions 13. The runners provide bearing surfaces for the bogie wheels 15, 16 which support the weight of the vehicle and the openings 14 between the rungs provide clearance spaces for the teeth 17 of a driving sprocket 18.

The body 10 is reinforced by rubberized fabric bands 20, 21 embedded therein and some of the plies of fabric extend from band to band through the rung portions, as at 22 to reinforce those portions and to hold the bands at the runners in properly spaced relation.

To provide further reinforcement of the track body 10 and to assume the driving torque load, laterally spaced-apart groups 23, 24 of endless tension members, preferably in the form of metallic cables, extend longitudinally of the body at the sides of the openings 14, and close to the fabric reinforcement, some of the plies of which adjacent the openings 14 may have their margins turned, as at 26 about the tension members for better anchorage thereto.

The body 10 is also formed with longitudinal ribs 32, 33 in the region of the tension members which provide bearing strips for shoulders of the sprocket 18. For further reinforcing the rung portions of the track, and for providing metallic driving and guiding members, metal bars 27 are provided at the rung portions and extend short of runner portions 11, 12. These bars may be exposed at the face of the runner portions and cross the tension members closely adjacent thereto although separated therefrom by a thin cushioning layer of the rubber-like material.

For guiding the track, the ends of the bars 27 are bent outwardly as at 28, 29 and project in parallel relation from the wheel-engaging face of the track, providing guide lugs 30, 31 which engage the sides of the drive sprocket and the bogie wheels to guide the track.

U-shaped clips of metal 34, 35 are secured to the bars, as by welding, and partially embrace the tension members 23, 24 but are preferably separated therefrom by a film of the rubber-like material about the tension members which resiliently unites them by a bond of vulcanization.

The central portions of the bars 27 are preferably of U-shape, as shown in Fig. 4 having downwardly directed margins 36, 37 for contact with the teeth of the drive sprocket. The body 10 may be formed with projections, such as the cross bars 40 for increased traction with the ground.

The form of the invention shown in Fig. 5 has a body 50 of resilient rubber or other rubber-like material having band reinforcements 51, 52 of a plurality of plies of rubberized fabric embedded therein in parallel relation to each other and extending longitudinally of the track. Openings 53 are formed through the center of the track providing clearance for the sprocket teeth of a driver 54.

Longitudinal ribs 55, 56 are formed on the track body for contacting the drive sprocket to support and guide the track therefrom. The bogie wheels 57, 58 however which carry the weight of the vehicle rest entirely upon the flexible runners 59, 60 at the margins of the track.

For carrying the torque load from the sprocket 54, bars 61 of metal are embedded in the rubber-like material of the body cross-wise of the track between the openings 53 and exposed at their margins adjacent the openings so as to provide driving surfaces for contact with the teeth of the driving sprocket 54. Substantially inextensible tension members 63, 64 extend longitudinally of the track at the sides of the openings in the region of the ribs 55, 56 completely embedded in and vulcanized to the body 50. The bars 61 extend laterally of the track only to span the tension members 63, 64 and short of the flexible runners 59, 60. U-shaped clips 65, 66 are secured, as by welding, to the ends of the bars 61, and partially embrace the tension elements, although the clips may be separated therefrom by a film of the rubber-like material which is vulcanized thereto. Some of the plies 51, 52 also extend across the track between the openings 53, as at 67.

In this form of the invention, the guiding lugs 30, 31 are omitted and the projection of the sprocket 54 between the ribs is depended upon for guiding and supporting the track at the driving sprocket.

In either form of the invention, the weight of the vehicle is carried solely upon the flexible runner margins of the track which are free from rigid metal parts and which transmit the load and resiliently cushion it from the ground, and are relatively free from the torque and tension load of the track. The fabric reinforcement prevents sharp flexing of the margins of the track by hinging action at the ends of the metal bars.

While in Figs. 3 and 5, the positions of both the sprocket and the bogie wheels is indicated at a single section of the track, it is to be understood that this is merely to illustrate the relation of the track to such parts of the vehicle and that contact of the drive sprocket with the track is at a different position along the track from that of contact with the bogie wheels.

Among the advantages of the invention are the features of the flexible, cushioning character of the weight-supporting portions of the track at the bogie wheels, so that the weight is transmitted directly through this cushion to the ground, rather than through embedded metal bars, and the feature of direct transmission of driving forces from the sprocket to the cables without substantially affecting the cushioning action of the weight-supporting parts. This has the result of greatly increasing the resistance of the track to chipping and chewing of the rubber by stones and gravel, and cushioning advantages of the friction drive type track are combined with positive driving advantages of the sprocket-drive track while avoiding disadvantages found in both types.

Variations may be made without departing from the scope of the invention as it is defined by the following claims.

We claim:

1. A track for a self-laying track type vehicle, said track comprising a flexible band of rubber-like material having marginal runner portions for supporting bogie wheels from the ground directly through said portions, an apertured sprocket-engaging portion between said runner portions, and flexible tension members embedded in said band at said sprocket-engaging portion between said apertured portion and said runner portion and extending longitudinally of the track in parallel relation to each other, said sprocket-engaging portion including cross-bars embedded in said band and terminating laterally of the band at said tension members short of said marginal runner portions to leave said runner portions substantially unstiffened by said cross bars thereby facilitating load support by said runner portions independently of said cross bars.

2. A track for a self-laying track type vehicle, said track comprising a flexible band of rubber-like material having marginal runner portions for supporting bogie wheels from the ground directly through said portions, an apertured sprocket-engaging portion between said runner portions, and flexible tension members embedded in said band at said sprocket-engaging portion between said apertured portion and said runner portion and extending longitudinally of the track in parallel relation to each other, said sprocket-engaging portion including cross-bars embedded in said band and terminating laterally of the band at said tension members short of said marginal runner portions to leave said runner portions substantially unstiffened by said cross bars thereby facilitating load support by said runner portions independently of said cross bars, and said bars having guide lugs projecting from the wheel contacting face of said band.

3. A track for a self-laying track type vehicle, said track comprising a flexible band of rubber-like material having marginal runner portions for supporting bogie wheels from the ground directly through said portions, an apertured sprocket-engaging portion between said runner portions, flexible tension members embedded in said band at said sprocket-engaging portion between said apertured portion and said runner portion and extending longitudinally of the track in parallel relation to each other, said sprocket-engaging portion including cross-bars embedded in said band and terminating laterally of the band at said tension members short of said marginal runner portions to leave said runner portions substantially unstiffened by said cross bars thereby facilitating load support by said runner portions independently of said cross bars, and flexible sheet reinforcing material extending from marginal portion to marginal portion across said sprocket-engaging portion and embedded in said rubber-like material between said tension members and the ground-engaging face of the track.

4. A track as defined in claim 3 in which portions of said sheet reinforcing material are folded about said tension members.

5. A track for a self-laying track type vehicle, said track comprising a flexible band of rubber-like material having marginal runner portions for supporting bogie wheels from the ground directly through said portions, an apertured sprocket-engaging portion therebetween, flexible tension members embedded in said band laterally of and between said runner portions and extending longitudinally of the track in parallel relation to each other, said sprocket-engaging portion including cross-bars embedded in said band between the apertures of said portion and terminating laterally of the band at said tension members short of said marginal runner portions to leave said runner portions substantially unstiffened by said cross bars thereby facilitating load support by said runner portions independently of said cross bars, said bars having turned margins exposed at the walls of the apertures for engaging sprocket teeth and having guide lugs integral with said bars projecting from the wheel-contacting face of said band.

6. A track for a self-laying track type vehicle of the type having bogie wheels to support the weight of the vehicle from the track and a driving sprocket for driving said track, said track comprising a flexible band of rubber-like material having marginal runner portions for directly supporting said bogie wheels from the ground and a medial apertured sprocket-engaging portion therebetween, flexible tension members embedded in said band between said runner portions and said medial apertured portion and extending longitudinally of the track in parallel relation to each other, guide ribs of rubber-like material integral with said band and extending along the same at said tension members, sprocket-engaging cross-bars embedded in said band between the apertures of said medial portion and terminating laterally of the band at said tension members short of said marginal runner zones, said bars having turned-over portions at their ends embracing said tension members, and sheet reinforcing material extending from marginal portion to marginal portion across said sprocket-engaging portion and embedded in said rubber-like material between said tension members and the ground-engaging face of the track.

7. A track for a self-laying track type vehicle, said track comprising a flexible band of rubber-like material providing a bogie-supporting cushion portion extending longitudinally of the band for supporting the bogie wheel from the ground directly through said portion, a flexible tension resisting structure of cables embedded in said band at a position laterally adjacent said cushion portion, and cross bars embedded in said band at said tension structure and stiffening the same and terminating laterally of the band short of said cushioning portion to leave said cushioning portion substantially unstiffened by said cross bars thereby facilitating load support by said cushioning portions independently of said cross bars.

8. A track for a self-laying track type vehicle, said track comprising a flexible band of rubber-like material having marginal runner portions for supporting bogie wheels from the ground directly through said portions, a drive-wheel engaging portion between said runner portions, and flexible tension members embedded in said band between said drive-wheel engaging portion and said runner portions and extending longitudinally of the track in parallel relation to each other, said drive-wheel engaging portion including cross-bars embedded in said band and terminating laterally of the band at said tension members short of said marginal runner portions to leave said runner portions substantially unstiffened by said cross bars thereby facilitating load support by said runner portions independently of said cross bars.

9. A track for a self-laying track type vehicle, said track comprising a flexible band of rubber-like material having marginal runner portions for supporting bogie wheels from the ground directly through said portions, a sprocket engaging portion between said runner portions, and flexible tension members embedded in said band between said runner portions and extending longitudinally of the track in parallel relation to each other, said sprocket engaging portion including cross bars embedded in said band and terminating laterally of the band at said tension members short of said marginal runner portions to leave said runner portions substantially unstiffened by said cross bars thereby facilitating load support by said runner portions independently of said cross bars.

CHARLES O. SLEMMONS.
ROBERT W. SMITH.

REFERENCES CITED

The following references are of record in the file of this patent:

UNITED STATES PATENTS

| Number | Name | Date |
|---|---|---|
| 1,400,100 | Reddaway | Dec. 13, 1921 |
| 1,627,287 | Kegresse | May 3, 1927 |
| 1,947,474 | Knox | Feb. 20, 1934 |
| 2,318,347 | Mayne | May 4, 1943 |
| 2,326,719 | Myers | Aug. 10, 1943 |